United States Patent [19]
Masuda et al.

[11] Patent Number: 5,605,119
[45] Date of Patent: Feb. 25, 1997

[54] EXHAUST CONTROL VALVE FOR ENGINE

[75] Inventors: Tatsuyuki Masuda; Kousei Maebashi; Michihisa Nakamura; Hidenori Suhara, all of Iwata, Japan

[73] Assignee: Yamaha Hatsudoki Kabushiki Kaisha, Iwata, Japan

[21] Appl. No.: 380,802

[22] Filed: Jan. 30, 1995

Related U.S. Application Data

[62] Division of Ser. No. 173,208, Dec. 23, 1993, Pat. No. 5,410,993.

[30] Foreign Application Priority Data

Dec. 25, 1992 [JP] Japan ................................. 4-357766

[51] Int. Cl.$^6$ ................................................. F02B 75/02
[52] U.S. Cl. ............................ 123/65 PE; 123/65 V; 60/314
[58] Field of Search ..................... 123/65 PE, 65 P, 123/65 V; 60/314

[56] References Cited

U.S. PATENT DOCUMENTS

| 4,121,552 | 10/1978 | Mithuo et al. | 123/65 PE |
|---|---|---|---|
| 4,388,894 | 6/1983 | Tanaka et al. | 123/323 |
| 4,397,272 | 8/1983 | Omote | 123/323 |
| 4,763,613 | 8/1988 | Arahata et al. | 123/323 |
| 4,793,347 | 12/1988 | Taniuchi et al. | 123/323 |
| 4,827,880 | 5/1989 | Ban et al. | 60/314 |
| 5,000,131 | 3/1991 | Masuda | 123/323 |
| 5,063,888 | 11/1991 | Ozawa et al. | 60/312 |
| 5,183,013 | 2/1993 | Ito et al. | 123/501 |
| 5,190,006 | 3/1993 | Motoyama et al. | 123/305 |

FOREIGN PATENT DOCUMENTS

| 0382063 | 1/1990 | European Pat. Off. . | |
|---|---|---|---|
| 86173901 | 6/1986 | Germany . | |
| 62-189316 | 8/1987 | Japan | 123/65 PE |
| 57-68508 | 4/1992 | Japan | 123/65 PE |
| 2175643 | 12/1986 | United Kingdom . | |

*Primary Examiner*—David A. Okonsky
*Attorney, Agent, or Firm*—Knobbe, Martens, Olson & Bear LLP

[57] ABSTRACT

An exhaust control valve arrangement for a two cycle internal combustion engine for altering the compression ratio to provide optimum running under all conditions. An arrangement is provided or cleaning the exhaust control valve and its surrounding cooperating surfaces of the engine upon shutting off of the engine to preclude the formations of deposits that can cause sticking of the valve element. The valve element is rotated through a number of cycles after the engine is stopped through a wider range than during its normal valving operation for removing deposits. The number of cycles is chosen in response to an engine condition such as length of time of running or amount of lubricant supplied to the engine. Various valve arrangements are disclosed that improve the cleaning operation and permit cleaning even while the engine is running.

5 Claims, 10 Drawing Sheets

EXHAUST CONTROL VALVE FOR ENGINE

This application is a divisional of application Ser. No. 08/173,208, filed Dec. 23, 1993 now U.S. Pat. No. 5,410,993.

BACKGROUND OF THE INVENTION

This invention relates to an exhaust control valve for an engine and more particularly to an improved structure and method for precluding sticking of such exhaust control valves.

It has been proposed with two cycle engines to employ, in addition to the main exhaust port, an auxiliary exhaust port positioned above the main exhaust port and which has the flow through it controlled by an exhaust control valve. By opening this auxiliary exhaust port, the compression ratio is lowered and by closing the exhaust control valve, the compression ratio is increased. The same effect can also be achieved by providing an exhaust control valve in the main exhaust port which selectively closes and opens an upper portion of the main exhaust port. In this way, it is possible to operate the engine under a higher compression ratio under low load low speed conditions so as to improve the performance and reduce the compression ratio under high speed high load conditions to avoid excess pressures in the combustion chamber and pre-ignition or knocking. Hence, these types of exhaust control valves are extremely effective in improving the performance of an engine under particularly difficult running conditions without sacrificing performance under other running conditions. Furthermore, the exhaust control valve can be closed during starting to raise the compression ratio and facilitate starting.

However, there is a difficulty in conjunction with these valves. Since the exhaust control valve is subject to the exhaust gas temperatures, there must be some adequate clearance provided so as to permit the valve to rotate freely between its opened and closed position. Of course, this clearance cannot be so great as to cause leakage of pressure when the exhaust control valve is closed. Also, because of the different materials employed for the exhaust control valve then the engine casting in which it is rotatably journalled, compensation for different thermal expansions is necessary. Thus, the clearances actually will be less when the engine is cold than when it is warm. Therefore, on initial starting of the engine, it may be difficult to operate the exhaust control valve.

In addition, since these valves are normally employed in two cycle engines and since there may be oil present in the exhaust gases, this oil can cause a problem once the engine is shut off. When the engine is running, the temperature will be high enough to avoid any problem. However, as the engine cools, residual oil may carbonize or coke on the control valve and form deposits which along with other foreign matter will make it difficult to operate the valve when the engine is restarted. Of course, the temperature differences aforenoted also will aggravate this situation.

It is, therefore, a principal object of this invention to provide an improved exhaust control valve structure and method of operating an exhaust control valve for an engine.

It is a further object of this invention to provide an improved structure and method for cleaning an exhaust control valve under at least some conditions so as to avoid stickage on start up and when operating at low temperatures.

It is a further object of this invention to provide an improved, self-cleaning type of exhaust control valve for an engine.

SUMMARY OF THE INVENTION

A first feature of this invention is adapted to be embodied in a two cycle internal combustion engine having a cylinder block having a cylinder bore. A piston reciprocates in the cylinder bore and an exhaust port is formed in the cylinder block from which combustion process products may exit the cylinder bore. Exhaust control valve means cooperate with the exhaust port and are movable between a first position for delaying the closing of the exhaust port and a second position for advancing the closing of the exhaust port.

In accordance with an apparatus for practicing the invention, means are provided for sensing the stopping of the engine and for operating the exhaust control valve means through at least one cycle of operation for cleaning deposits from the exhaust control valve means.

In accordance with a method for practicing the invention, the stopping of the engine is sensed and the exhaust control valve means is operated through at least one cycle of operation upon the sensing of the stopping of the engine for cleaning deposits from the exhaust control means.

Another feature of the invention is adapted to be embodied in an exhaust control valve for an internal combustion engine that is comprised of a member forming an exhaust passage. A cylinder bore intersects the exhaust passage and a valve element has cylindrical end portions that are journalled in the bore on opposite sides of the exhaust passage for rotation between first and second positions. The valve element has a valving portion formed between the end portions and which is movable into a non-obstructing position within a portion of the bore intersecting the exhaust passage when the valve element is in its first position for unrestricted flow through the exhaust passage. The valving portion is in a position that extends across the exhaust passage and obstructs the flow therethrough when it is in its second position. The valving portion of the valve element has the general shape of a cylindrical segment complementary to the bore portion. A surface discontinuity is formed in the cylindrical segment to form a scraping edge for clearing of the bore portion of deposits upon rotation of the valve element.

DETAILED DESCRIPTION OF THE PREFERRED EMBODIMENTS OF THE INVENTION

Figure 1:
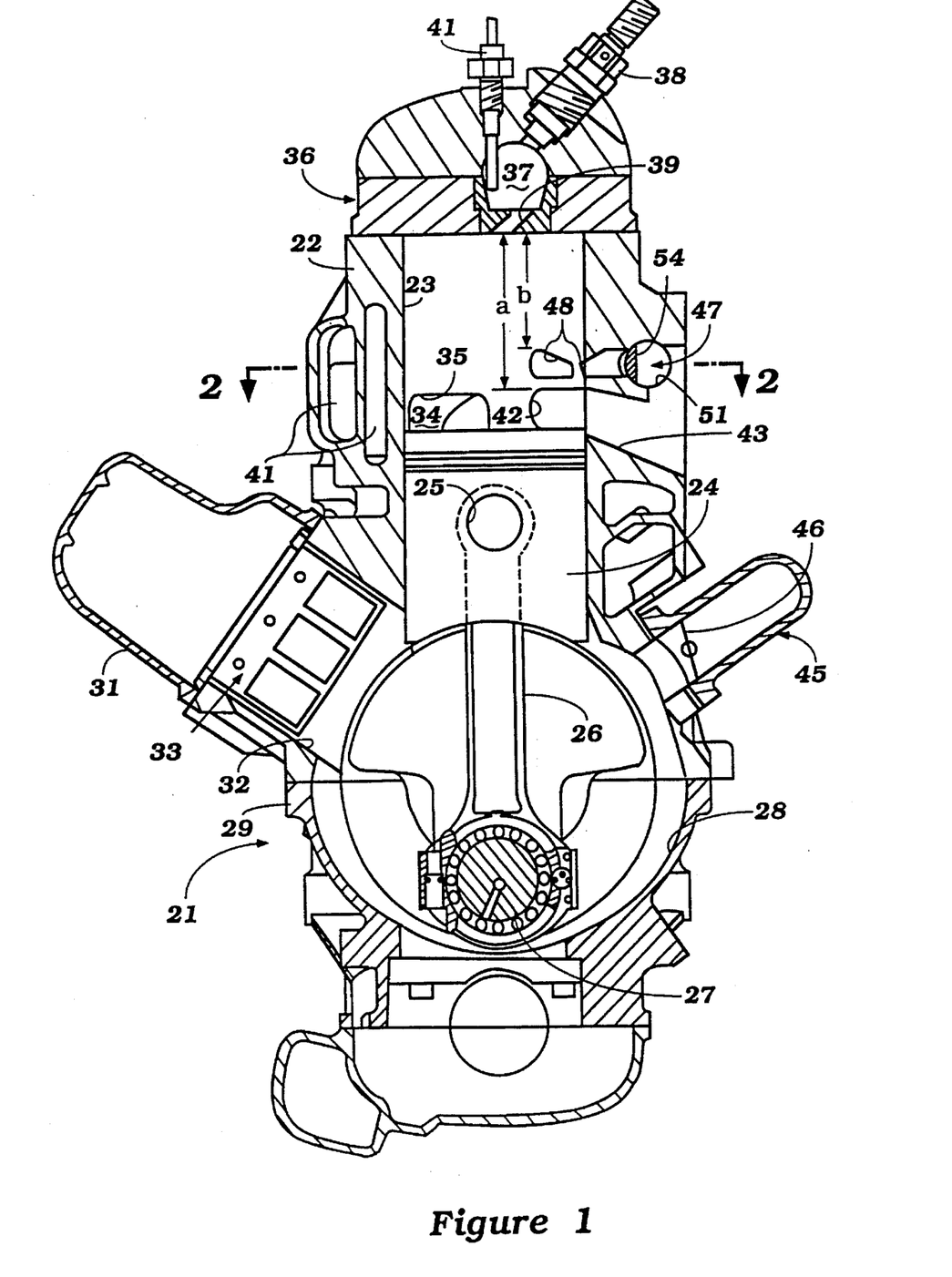
FIG. 1 is a cross-sectional view taken through a single cylinder of a multiple cylinder internal combustion engine constructed and operated in accordance with an embodiment of the invention.
Figure 2:
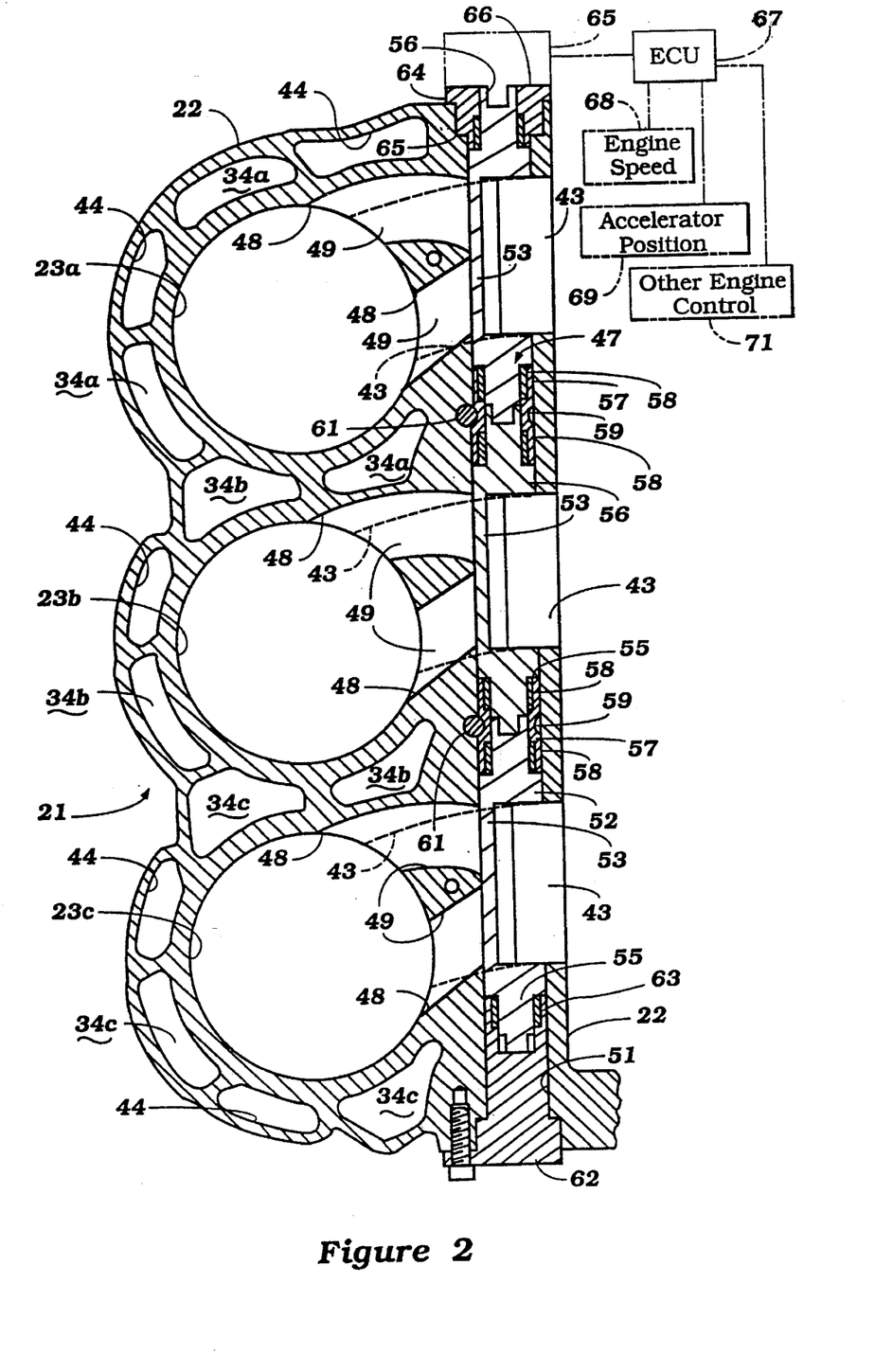
FIG. 2 is an enlarged cross-sectional view taken along the line 2—2 of FIG. 1 and shows the actuating system for the exhaust control valve in schematic fashion.

Referring first to the embodiment of FIGS. 1–7 and initially primarily to FIGS. 1 and 2, a three cylinder in-line type of two cycle crankcase compression diesel engine is identified generally by the reference numeral 21. Although the invention is described in conjunction with a three cylinder in-line type of engine, it will be readily apparent to those skilled in the art how the invention can be practiced with engines having other cylinder numbers or other configurations. Also, although the invention is described in conjunction with a diesel engine, it is to be understood that the invention may also be employed with spark ignited engines. Also, although the invention is described in conjunction with two cycle engines, with which it has the greatest application, certain facets of the invention may be employed with four stroke engines.

The engine 21 is comprised of a cylinder block 22 which is formed of a suitable material such as aluminum or aluminum alloy and which forms three aligned cylinder bores 23. The cylinder bores 23 may be formed by pressed or cast in liners (not shown). Alternatively, the cylinder bores 23 may be formed directly in the aluminum, if this material is employed, by boring and suitable surface treating to provide the desired bore finish. A piston 24 is reciprocally supported in each cylinder bore 23 and is connected by means of a piston pin 25 to the small or upper end of a respective connecting rod 26. The connecting rods 26 have their lower or big ends journalled on the throws of a crankshaft 27, as is well known in this art.

The crankshaft 27 is rotatably journalled within a crankcase chamber 28 formed by the lower end of the cylinder block 22 and a crankcase member 29 that is affixed to the cylinder block 22 in any known manner. As is typical with two cycle engines, the crankcase chambers 28 associated with each of the cylinder bores 23 are sealed relative to each other in any well known manner.

An intake air charge is delivered to the individual crankcase chamber 28 by an induction system which includes an intake manifold 31 which receives atmospheric air from an air inlet (not shown) and delivers it to the crankcase chambers 28 through intake ports 32 formed in the lower portion of the cylinder block 22. As is typical with two cycle crankcase compression engines, a reed-type valve assembly 33 is provided in each of the intake ports 32 so as to permit air to flow freely into the crankcase chambers 28 while precluding flow in the reverse direction when the charge is being compressed by downward movement of the pistons 24.

The charge which is compressed in the crankcase chambers 28 is transferred to an area above the pistons 24 to the combustion chamber of the engine, which combustion chamber is formed in a manner which will be described, by a scavenging system of any known type. In the illustrated embodiment, a schnurle type of scavenging system is employed that utilizes three circumferentially spaced scavenge passages 34 for each cylinder bore 23. In order to permit understanding of which scavenge passages serve each cylinder in FIG. 2, the cylinder bores 23 are designated by the subscripts a, b, and c and the scavenge passages 34 are also so designated.

It will be seen from FIG. 2, that these scavenge passages 34 are rotated slightly in a counterclockwise direction about the cylinder bore axis so as to permit the length of the cylinder block 22 to be reduced as should be readily apparent from this figure.

The scavenge passages 34 terminate in scavenge ports 35 that are circumferentially spaced around the cylinder bores 23.

A cylinder head assembly, indicated generally by the reference numeral 36 is affixed in any suitable manner to the cylinder block 22 and forms with the cylinder bore 23 and heads of the pistons 24 the combustion chambers of the engine. In the illustrated embodiment, the cylinder head assembly 36 is provided with individual pre-combustion or torch chambers 37 into which a fuel charge is sprayed by a fuel injector 38. The pre-chambers 37 communicate with the main chambers through relatively restricted throat passages 39 so that combustion which has been initiated in the pre-chamber 37 will rapidly propagate into the main combustion chamber. A glow plug 41 may be mounted in the cylinder head assembly 36 within the torch chamber 37 to assist in the initiation of combustion either at starting or during the entire running of the engine.

The charge which has been ignited by the high compression ratio of the engine will expand and drive the piston 24 downwardly until it opens a main exhaust port 42 formed in the cylinder block 22 a position between pairs of the scavenge passages 34 associated With each cylinder bore 23. The exhaust ports 42 are formed at the termination of a main exhaust passage 43 formed in the side of the cylinder block 22 and which cooperates with a suitable exhaust system (not shown) for transferring the exhaust gases to the atmosphere and for silencing purposes.

In the illustrated embodiment, the engine 21 is water cooled and to that end, the cylinder block 22 is provided with cooling jackets 44 through which the liquid coolant is circulated by a coolant pump of any known type. In addition, the cylinder head 36 is likewise provided with cooling jackets through which this coolant is circulated.

In order to improve mid range and low speed performance, an arrangement may be employed as described in U.S. Pat. No. 5,251,584, issued Oct. 12, 1993 and assigned to the assignee hereof, that interconnects the crankcase chambers 28 and which system is indicate generally by the reference numeral 45. As described in that patent, throttle valves 46 control the intercommunication of the crankcase chambers 28 with each other under some running conditions so as to decrease the scavenging airflow and improve engine performance.

The construction of the engine 21 as thus far described may be considered to be conventional and, for that reason, further details of the basic engine construction are not believed to be necessary to understand the invention. The invention relates to an exhaust control valve assembly, indicated generally by the reference numeral 47 and which is additionally shown in FIGS. 3 and 4. This exhaust control valve system controls the compression ratio of the engine by selectively opening and closing a pair of auxiliary exhaust ports 48 which are formed in the cylinder block 22 at a point in the cylinder bore 23 above the main exhaust port 42.

Because the auxiliary exhaust ports 48 are disposed above the main exhaust ports 42 they will close at a later time. Thus, if the auxiliary exhaust ports 48 are opened, compression in the cylinder bore 23 by upward movement of the piston 24 will not occur until the piston 24 reaches the point b above bottom dead center and there will be reduced compression and compression will not begin to any significant amount until this point. However, if the auxiliary exhaust ports 48 are closed, then compression will begin when the piston 24 reaches the point a and thus there will be a higher compression ratio under this condition.

Figure 3:
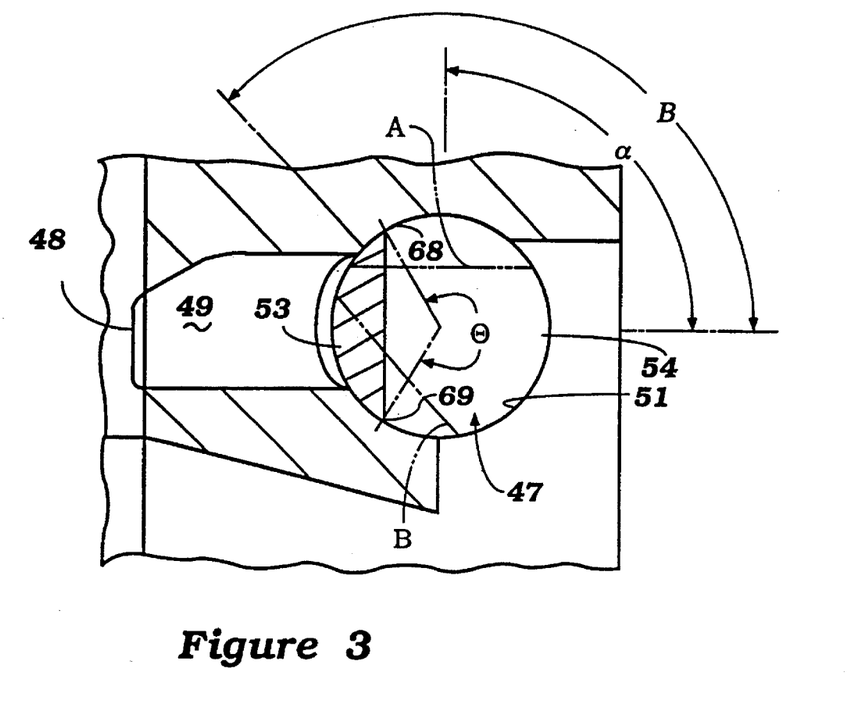
FIG. 3 is an enlarged cross-sectional view of the area of the engine incorporating the exhaust control valve and is taken along the same plane as FIG. 1.

The auxiliary exhaust ports 48 are formed at the beginning of a pair of auxiliary exhaust passages 49 having a Y-shaped configuration and which merge at a common point where the exhaust control valve 47 is positioned. The exhaust control valve 47 is supported within a transversely extending bore 51 formed in the cylinder block 22 at a point where the auxiliary exhaust passages 49 meet. Downstream of the exhaust control valve 47, the auxiliary exhaust passages 49 merge with the main exhaust passage 43 so that all exhaust passages are served by the aforenoted exhaust system.

It should be noted that the diameter of the bore 51 in which the exhaust control valve 47 is rotatably supported is larger than the effective height of the auxiliary exhaust passages 49. The reason for this will become apparent. It should also be noted that the exhaust control valve 47 is formed of a plurality of individual exhaust control valve elements which are interrelated in a manner to be described.

Each exhaust control valve element 47 is formed with a pair of cylindrical end surfaces 52 which are journalled in the portions of the bore 51 disposed on opposite sides of the auxiliary exhaust passages 49. There is further provided a cylindrical segment 53 which extends between the end portions 52 but which is interrupted by a cutout 54 so that the cylindrical portions 53 actually functions as the valving portion of the exhaust control valve elements 47. As may be seen in FIG. 3, when the exhaust control valve element 47 is rotated to the position shown in solid lines, the auxiliary exhaust passages 49 will be completely blocked and closed. However, when the valve element 47 is rotated to the position shown by the dot dash line A, the cylindrical segment 53 will be substantially completely positioned within the bore 51 and there will be provided no obstruction to the flow of exhaust gases through the auxiliary exhaust passages 49 from the auxiliary exhaust ports 48. Under this condition, the compression ratio will be at its lowest while the compression ratio will be at its highest when the exhaust control valve elements 47 are closed.

The exhaust control valve elements 47 are formed from a high temperature resistant material such as a steel alloy or the like and thus there will be a slightly different thermal expansion and contraction ratio than that of the cylinder block 22. This thermal expansion is accommodated by having a tongue portion 55 of each control valve element 47 at one end and a groove portion 56 formed at the other end thereof. As may be seen in FIG. 2, the tongue and groove portions 55 and 56 of the exhaust control valve elements 47 are interlinked with each other with one exhaust control valve element 47 provided for each cylinder bore 23. This tongue and groove connection will permit relative thermal expansion and contraction and between the valve elements 47 and the cylinder block 22 while ensuring that the valve elements 47 are all in the same angular position.

The area between adjacent cylinder bores 23 is provided with a guide sleeve 57 for receiving the tongue and groove portions 55 and 56 of adjacent exhaust valve elements 47. These guide sleeves 57 carry bushings 58 for journaling the cylindrical portions of the tongue and groove parts 55 and 56. In addition, a circumferential slot 59 is formed in each guide sleeve 57 and is held axially in place by a locating pin or screw 61.

One end of the cylinder block bore 51 is closed by means of a closure plug 62 which has a counterbored end that receives an anti-friction bushing 63 for journaling the tongue portion 55 of the exhaust control valve element 47 at this end of the engine.

At the opposite end, there is provided a closure member 64 which carries an anti-friction bushing 65 for supporting the grooved end 56 of this control valve element 47. A stepper motor 65 is affixed to the cylinder block at this end and has a shaft with an end that has a tongue 66 that is received in the grooved end 56 for controlling the angular position of all of the control valve elements 47.

The stepper motor 65 is controlled by an ECU 67 which is provided with an appropriate control strategy for positioning the control valve elements 47 in the desired position so as to maintain a high compression ratio under low load low speed conditions and gradually reduce the compression ratio to that set by the position of the main exhaust port 42 under high speed high load conditions so as to prevent knocking. Thus, good performance is achieved under all running conditions.

In addition, there is provided a cleaning cycle for operating the exhaust control valve 47 in a manner to be described when the engine is stopped. This cleaning action will remove any deposits which form on the exhaust control valve 47 and specifically remove any excess oil that may be present so that the oil cannot coke or burn when the engine is shut off and the flow of coolant through the cooling jacket 44 ceases. This lubricant could then form carbon deposits that could cause the control valve elements 47 to stick in their position or be difficult to operate by the stepper motor 65 particularly after the engine 21 has cooled down.

Referring again to FIG. 3, it has already been noted that the valving element portion 53 of the exhaust control valve elements 47 completely moves into the portion of the cylinder block bore 51 that passes across the upper portion of the auxiliary exhaust passages 49 when the exhaust control valve element 47 is in its opened position. This movement of the exhaust control valve portion 53 to its fully open position will cause an upper edge 68 formed at one end of the valving portion 53 by the cutout 54 to move across this portion of the bore and will actually scrape any deposits therefrom during the opening movement.

In accordance with the control strategy which will be described, when the engine 21 is stopped, the control valve element 47 is rotated between its fully open position shown by the dot, dot, dash line A to a further cleaning position indicated by the dash, dot, dot line B wherein a further edge 69 formed at the opposite side of the valving portion 53 by the cutout 54 will sweep across the lower portion of the cylinder block bore 51 that extends across the lower portion of the auxiliary exhaust passages 49 so as to further remove deposits from this area.

By moving the valve element 47 through a number of cycles upon stopping of the engine, it will be ensured that the surfaces which define the bore 51 will be completely cleared of any deposits. The actual degree of rotation of the control valve element 47 during this cleaning operation is indicated by the angle β in this figure. This is substantially greater than the normal movement of the control valve element 47 between its closed and open positions which is indicated at approximately a right angle by the angle α in this figure.

As shown in FIG. 2, the ECU 67 receives various signals from various sensors and specifically in the illustrated embodiment, receives an engine speed signal from an engine speed sensor 68 and an accelerator or throttle control position signal from an accelerator position sensor 69. Various other sensors may be employed and these operate the exhaust control valves 47 to position them in either their fully opened or fully closed or intermediate positions depending upon any desired control strategy. Basically, and has already been noted, the exhaust control valve elements 47 are closed so as to provide a high compression ratio at low speeds and low loads and are opened to provide a lower compression ratio under high speed high load conditions for the aforenoted reasons. The ECU 67 may control other engine functions as indicated by the schematic box 71 in FIG. 2 these other functions being, for example, timing and duration of fuel injection by the fuel injector 38.

Figure 5:
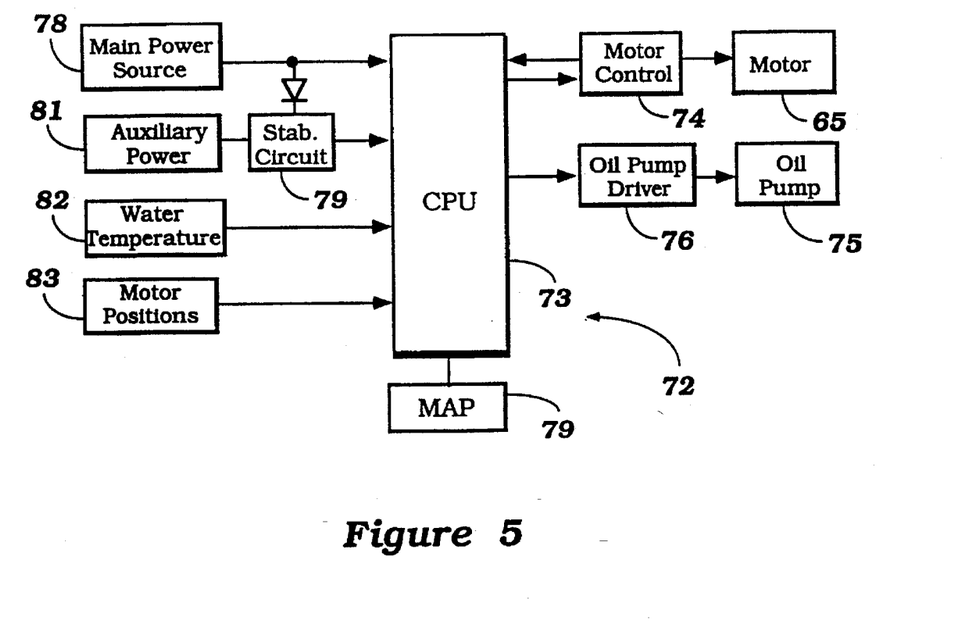
FIG. 5 is a schematic view showing the components of the system for operating the exhaust control valve cleaning cycle.
Figure 6:
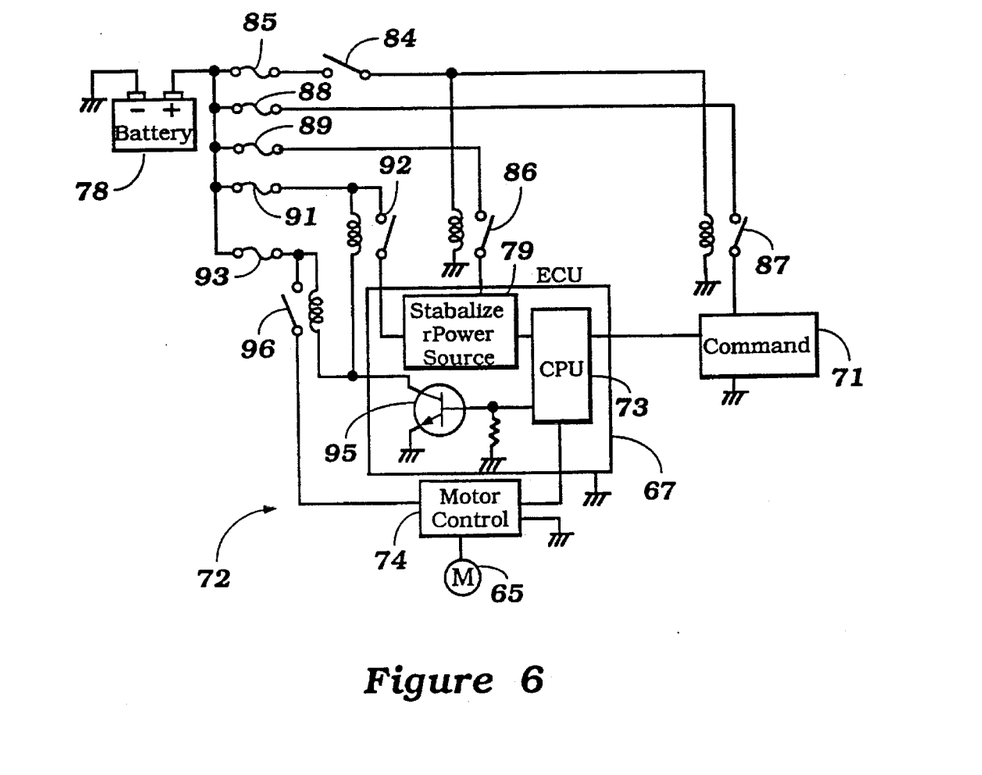
FIG. 6 is a schematic electrical diagram showing the structure for operating the exhaust control valve and for practicing the invention.

The self cleaning function is provided by a separate control, shown schematically in FIG. 5 and in an electrical diagram in FIG. 6. This system is indicated generally by the reference numeral 72 and includes an CPU 73 which receives various signals and controls, as will be described.

These include a motor control circuit 74 which transmits data to and from the CPU 73 and which operates the stepper motor 65 in accordance with a control routine as will be described. In addition, the engine 21 is provided with a lubricating system which includes an oil pump 75 which is controlled by an oil pump driver circuit 76. The oil pump 75 delivers lubricant to the engine 21 in any well known manner and the amount of lubricant which is delivered by the oil pump will depend upon the engine running condition so as to ensure adequate lubrication for the engine under all running conditions but also so as to ensure against excess lubrication. The system is such that the lubricant pump 75 provides a finite amount of lubricant each time it is operated and the amount of lubricant supplied to the engine is controlled by the CPU 73 and oil pump driver 76 to drive the pump 75 a number of cycles necessary to provide adequate lubrication for the engine during its running condition. This information is derived by various sensors that input data to the CPU 73 and an internal map 77 of the ECU 73 that contains data on these signals and the appropriate amount of lubricant.

The ECU 73 receives electrical power both from a main power source, indicated schematically at 78 and switches this main power to the motor control 74 for the stepper motor 65 and also to the oil pump driver circuit 76 and oil pump 75. In addition, a stabilizer circuit 79 provides a stabilized voltage signal to the CPU from both the main power source 78 and an auxiliary power source 81 which provides power after a main switch (to be described) has been opened.

For the self cleaning function, there is provided an engine temperature signal from a water temperature sensor 82 and a signal indicating the position of the stepping motor 65 from a potentiometer 83 coupled to the output shaft 66 of the stepper motor 65. In accordance with one control strategy for operating the self cleaning function, the system senses when the engine is stopped, then delays the self cleaning action until the engine temperature has fallen below a predetermined temperature which predetermined temperature is lower than the normal operating temperature of the engine but above ambient temperature and then actuates the exhaust control valve element 47 through a predetermined number of cycles rotating through the angle β between the positions A and B of FIG. 3 to achieve the cleaning function.

The number of cycles chosen in accordance with a preferred control strategy is determined by the amount of lubricant that has been supplied to the engine during its running. This may either be the total amount of lubricant supplied by the lubricant pump 75 during the entire time between when the engine was started and stopped or a predetermined time period immediately prior to shutting off of the engine. A time period of something in the order of 15 minutes may be satisfactory in accordance with a preferred embodiment of the invention. This amount of lubricant is determined by a map such as map 77 which indicates the amount of lubricant supplied for the number of times when the oil pump 75 has been actuated by the oil pump driver circuit 76. This control routine will be described later by reference to FIG. 7.

It should be obvious that a source of electrical power must be available for driving the stepper motor 65 when the engine is stopped. Normally the engine is stopped by the opening of a main switch for the control circuit and this main switch is shown in FIG. 6 and is identified generally by the reference numeral 84. A fuse 85 connects the main switch 84 to the battery 78 and when the main switch 84 is closed, a pair of relay switches 86, which power the ECU 67 and 87 which powers the other engine controls 71 will also be closed. Fuses 88 and 89 are provided in the circuits between the battery 78 and the relay switches 86 and 87 and the ECU 67 and other control 71.

The auxiliary power source which is available when the main switch 84 is opened is comprised of a first fused circuit 91 to a further relay 92 which includes the stabilized power source 79 when the main power source is not in circuit. In addition, there is provided a fused circuit 93 that actuates a switching transistor 95 and a further relay switch 96 that powers the motor control circuit 74 when the main switch 84 is open.

FIG. 6 shows the condition of the circuit when the main switch 84 is opened and after the cleaning action has timed out. It will be seen that all of the relay operated switches 86, 87, 92 and 96 will be opened.

Upon closure of the main switch 84, the relay switches 86 and 87 will be closed and the other control 71 will be activated and the stabilized power source 79 will be supplied with electrical power to power up the CPU 73. When this happens, the solid state switch (transistor) 95 will be switched on and the relays 92 and 96 energized so as to close the respective switches so as to provide electrical power to the stabilized power source 79 and to the motor control circuit 74. Normal motor control operation is then operated for operating the stepper motor 65 and exhaust control valves 47 as previously noted.

When the switch 84 is opened, the relay switches 86 and 87 will be opened, but the CPU 73 will still have the transistor 95 switched on so that the relay switches 92 and 96 are energized and the cleaning operation can be performed. After the desired number of cleaning steps, determined as will be described later, the CPU 73 has an internal timer which times out and turns off the transistor 95 to open the switches 92 and 96 and return the circuit to the position shown in FIG. 6.

Figure 7:
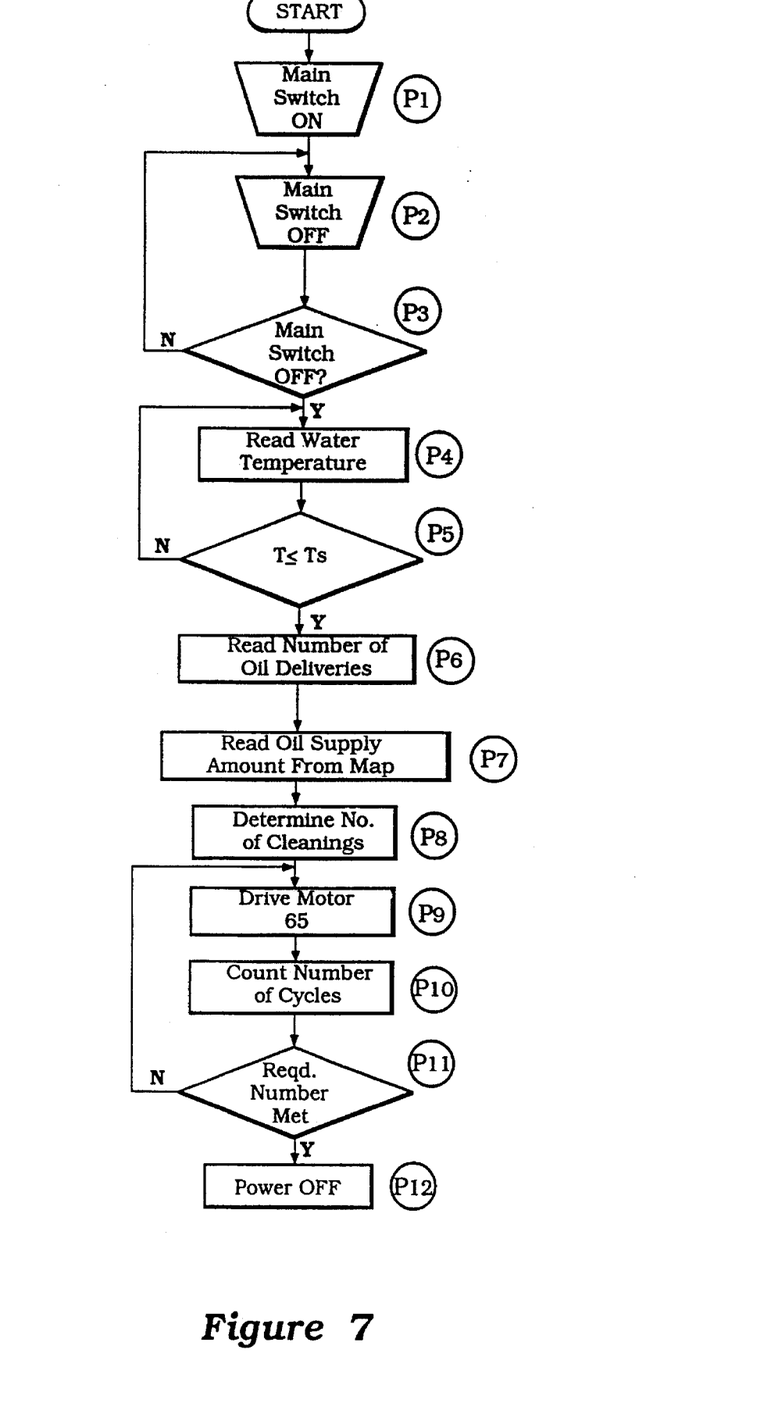
FIG. 7 is a block diagram showing one control routine which may be employed in conjunction with the invention.

The control routine for operating this system will now be described by particular reference to FIG. 7 which describes only the self cleaning operation. The control routine begins when the main switch 84 is turned on at the step P1 and continues on until the main switch 84 is turned off at the step P2. Then at the step P3 it is confirmed whether or not the main switch 84 has in fact been turned off. It has not, the program repeats back to before the step P2.

If, however, at the step P3 it has been confirmed that the main switch 84 has been turned off, the program then moves to the step p4 so as to read the engine water temperature from the engine water temperature sensor 82. The program then moves to the step P5 to determine if the red water temperature T is equal to or less than a predetermined temperature $T_s$. As has been previously noted, the temperature $T_s$ is chosen to be a temperature that is lower than the normal running temperature of the engine 21 but which is greater than ambient temperature.

That is, the self cleaning operation is initiated at a temperature lower than normal operating temperature so that clearances can be reduced but not at the lowest ambient temperature. The reason for this is that the clearances may be reduced enough at this time for deposits to have begun to make operation of the exhaust control valve element 47 difficult. Hence, it is desirable to initiate the cleaning action so as to remove retained oil or other deposits before they can carbonize and solidify.

If at the step P5 the engine temperature has not fallen to the temperature TS, the program returns back to the step P4. If, however, at the step P5 it has been determined that the temperature is less than or equal to the temperature $T_s$, then the program moves to the step P6 to determine the number of oil deliveries which the oil pump 75 has made. As has been previously noted, this is either the total number of oil deliveries between the time when the main switch has been turned on at P1 until the time it has been turned off at P2 or a predetermined finite time before the main switch 84 is turned off at P2. A relatively long time period such as 15 minutes may be chosen so as to ensure that the number of cleaning steps would be appropriate for the amount of lubricant which had been supplied to the engine and may still be present in the area of the exhaust control elements 47. The program then moves to the step P7 so as to read the amount of lubricant which has been supplied by the number of pump strokes from the map 77 of the CPU 73.

The program then moves to the step P8 so as to determine the number of cleaning strokes required for the control valve elements 47. This information may also be stored in the map 77. The program then moves to the step P9 so as to drive the stepper drive motor 65 through one cycle of operation. Regardless of the position of the control valve element 47 at the time the engine has been shut off, the control valve element 47 is rotated first to counterclockwise to the position B, then clockwise to the position A in FIG. 3 and then return to the fully closed position as shown in solid lines in FIG. 3. This is the position where the control valve element 47 is parked and this position is chosen because it provides the minimum degree of contact between the valving surface 53 and the portion of the cylinder block defining the bore 51. This reduces the likelihood of sticking when the engine is again restarted.

Once the drive motor 65 is driven through a single cycle, as aforedescribed, then the program moves to the step P10 to add a count to the number of cycles that has been driven and then move to the step P so as to determine if the count reaches the number of cleaning cycles which have been determined at the step P8. If not, the program moves back to the step P9 and repeats until this number has been reached.

When the requisite number of cleaning cycles has been completed at as determined at the step P11, the program moves to the step P12 so as to turn the electrical power off. This is done by having the CPU 73 switch off the switching transistor 95 which then de-energizes the relay switches 92 and 96 and cuts off the power supply to the motor circuit 74 and stabilizer circuit 79.

Figure 4:
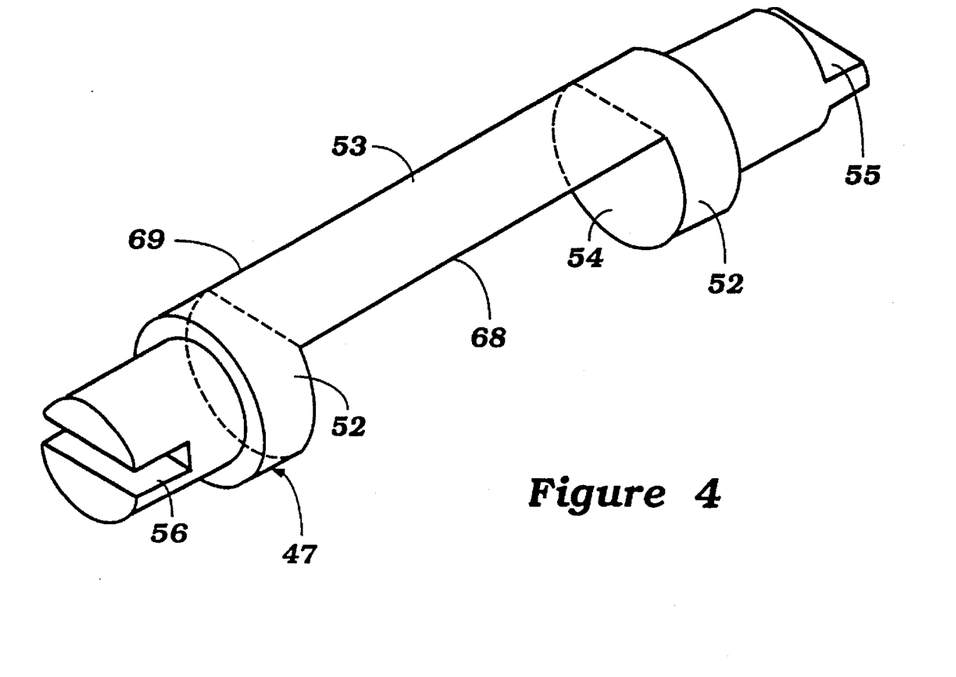
FIG. 4 is a perspective view showing one of the exhaust control valve segments.
Figure 8:
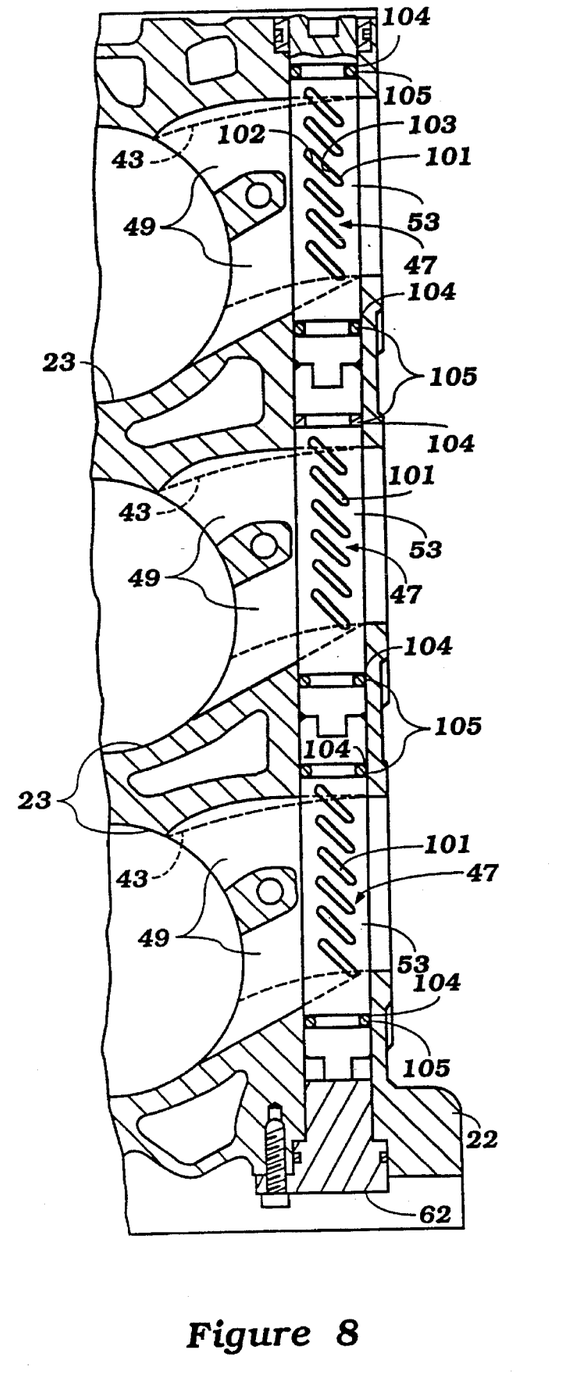
FIG. 8 is a cross-sectional view, in part, similar to FIG. 2, and shows another embodiment of the invention.
Figure 9:
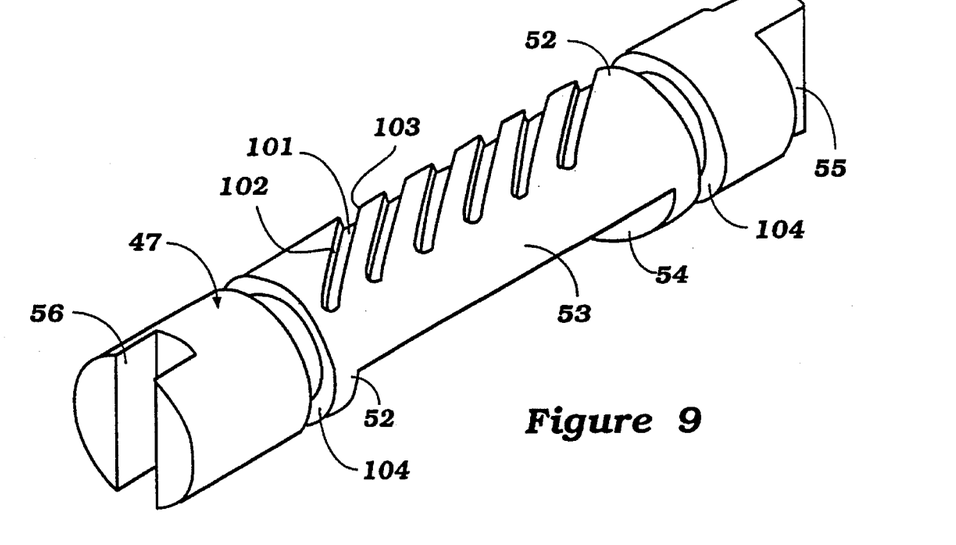
FIG. 9 is a perspective view, in part similar to FIG. 4, and shows the embodiment of exhaust control valve used in FIG. 8.

In the embodiment of the invention as thus far described, the edge portion 68 and 69 of the valving portion 53 are the actual portions that form the cleaning function. That is, the valve surface 53 itself does not really perform any cleaning function. FIGS. 8 and 9 show another embodiment which differs primarily from the embodiment of FIGS. 1–7 in the valving surface also is provided with an arrangement so as to assist in the cleaning function. Aside from this and one other distinction, that dealing with the sealing of the individual valving elements, this embodiment is the same as that previously described and, for that reason, components which are the same or substantially the same have been identified by the same reference numerals and will be described again only insofar as is necessary to understand the construction and operation of this embodiment. Also, because these are the only differences from the previously described embodiment, only a view similar to FIGS. 2 and 4 are required in order to describe this embodiment.

Referring specifically to FIGS. 8 and 9, the valving surfaces 53 of each of the control valve elements 47 are provided with a plurality of helically shaped slots 101. These slots 101 define opposite edge portions 102 and 103 which will sweep across the surfaces of the bore 51 on opposite sides of the auxiliary exhaust passages 49 during the cleaning operation. In addition, these edges 102 and 103 will also sweep across the upper portion of the bore 51 above the auxiliary exhaust passages 49 during the actual opening and closing of the valve elements 47. Hence, there will be a continuous cleaning operation not only after the engine is shut down but even while the engine is running.

The circumferential extension of the slots 101 is less than the area encompassed by the bore 51 when the valve element 47 is in its fully open position as shown in the dot, dash line A of FIG. 3. Hence, the slots 101 will not permit any gas flow around the valving surface 53 to in effect bypass the control valve elements 47 regardless of their position.

In this embodiment, the end portions 55 and 56 of the valve elements 47 are of the same diameter as the valving surface 53. Circumferential recesses 104 are formed adjacent the end portions 55 and 56 and outwardly of the bearing portions 52 so as to receive 0-ring seals 103 for sealing purposes. Hence, the sleeves and bushings of the previous embodiment are not necessary with this embodiment.

Figure 10:
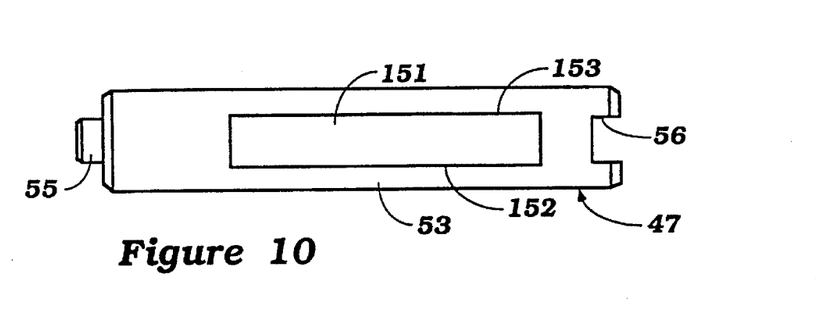
FIG. 10 is a top plan view of an exhaust control valve element constructed in accordance with another embodiment of the invention.
Figure 11:
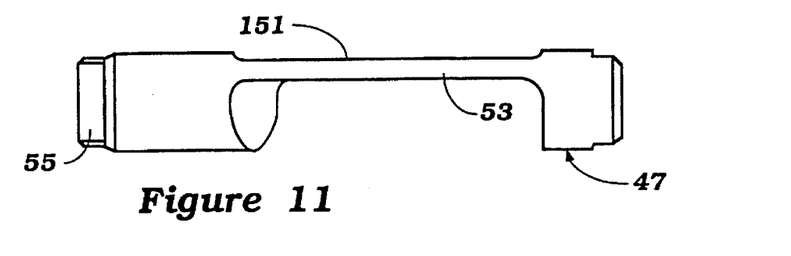
FIG. 11 is a side elevational view of the exhaust control valve of this embodiment.
Figure 12:
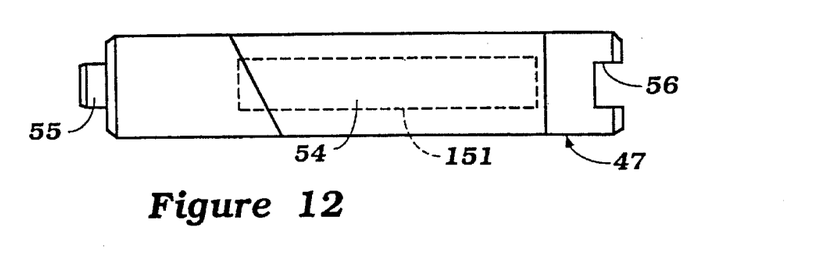
FIG. 12 is a bottom plan view of the exhaust control valve of this embodiment.

FIGS. 10–12 show another embodiment of the invention which, like the embodiment of FIGS. 8 and 9 differs from the previously described embodiment of FIGS. 1–7 only in the way in which the cleaning function is achieved. In this embodiment, the valving surface 53 is provided with a flat machined surface 151 that defines a pair of edge surfaces 152 and 153 which act as scraping edges for the cleaning operation. Thus, like the embodiment of FIGS. 8 and 9, further cleaning functions can be accomplished so as to ensure against anti-sticking.

In all of the embodiments as thus far described, when the valve element is rotated for its cleaning operation and the edges which have removed the foreign particles reach the area of communication with the auxiliary exhaust passages 49, the foreign particles which are removed will be free to fall into the exhaust system so they cannot subsequently foul the operation of the valve elements 47.

In the embodiments of the invention as thus far described, the number of cleaning cycles of the exhaust control valve 47 has been determined by the amount of lubricant supplied to the engine. Of course, other criteria may be employed such as the total time which the engine has run or the actual operating temperature of the engine at the time the engine was running. Of course, the higher the temperature or the longer the time of running, the more cleaning cycles that may be employed.

Figure 13:
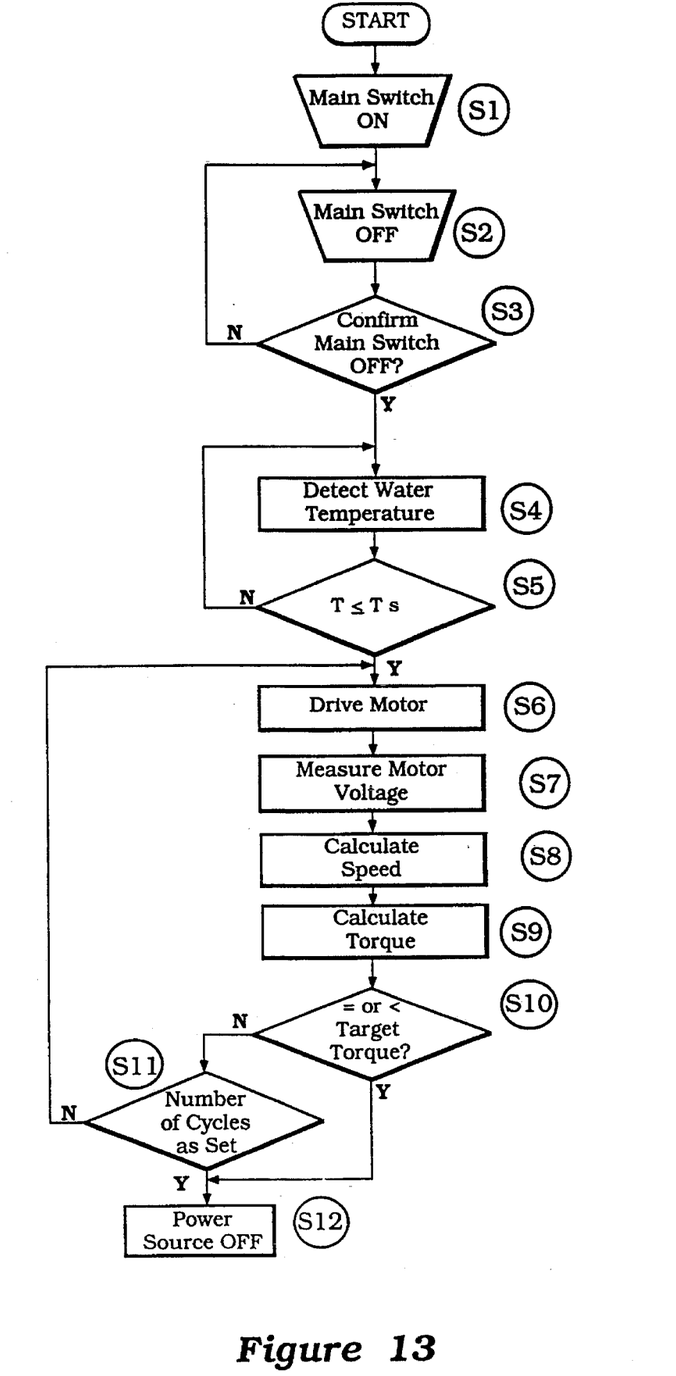
FIG. 13 is a block diagram showing a control routine in accordance with another embodiment of the invention.

Also, it may be possible to determine the number of cleaning cycles required by the force necessary to turn the valve elements 47. That is, when the valve elements 47 carry foreign material they will be more difficult to rotate than when they are clean. FIG. 13 shows an embodiment wherein the number of cleaning cycles is determined at least in part by this function. Since this is the only difference between this embodiment and those previously described, only the control routine as shown in FIG. 13 is necessary to understand this embodiment of the invention.

In this embodiment, when the program starts and the main switch is turned on at the step S1, the program is enabled. If the main switch is subsequently turned off at the point S2 the program then initiates the step S3 to confirm that the main switch has been turned off. If it has not been turned off, the program repeats back to the step S2.

If, however, at the step S3 it is confirmed that the main switch has been turned off then the program moves to the step S4 as with the previous embodiment, to detect the engine operating temperature at the time the engine was shut off.

The program then moves to the step S5 to determine if the engine operating temperature T is equal to or less than the desired temperature $T_s$ at which the cleaning operation should be initiated. As previously noted, this temperature $T_s$ should be something less than normal operating temperature but greater than ambient temperature.

If the temperature is not equal to or less than the temperature $T_s$ the program repeats back to the step S4. If, however, the temperature is equal to or less than the temperature $T_s$ the stepper motor 65 is begun to operate so as to run through a number of cleaning cycles which may be determined as aforenoted. The program then moves to the step S8 so as to measure the drive motor voltage and at the step S8 to calculate the speed of the drive motor. From these figures it is then possible at the step S9 to calculate the torque required in order to rotate the valve element 47.

At the step S10, the calculated motor torque is compared with the target minimum motor torque indicative that cleaning has been accomplished. If it is not yet fully cleaned, the program then moves to the step S so as to measure the number of cleaning cycles and compare them with a preset maximum number of desired cycles. It is necessary to set a maximum number of cycles as if the valve is truly bound up and cannot be completely clean, attempts would be made to cycle the valve infinitely and needlessly. Hence, at the step S11, it is confirmed that this maximum preset number of cycles is not exceeded. As long as it is not, the program returns back to the step S6.

If, however, the torque of the stepper motor 65 indicates that the valve has been adequately cleaned or at the step S11 that the predetermined maximum number of cycles has been achieved, then the program moves to the step S12 to shut off the source of power from the auxiliary circuit to the stepper motor and discontinue the cleaning action.

Figure 14:
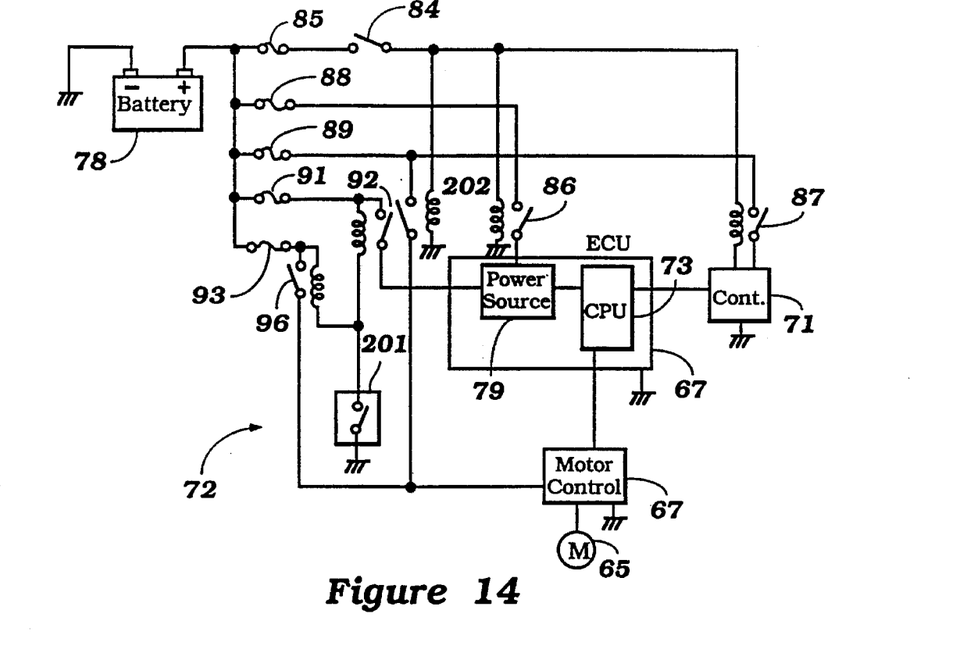
FIG. 14 is a schematic electrical diagram of another type of control circuit for the exhaust control valve.

One type of circuit has been shown in FIG. 6 for providing electrical power to drive the stepper motor 65 to effect the cleaning operation when the main switch 84 is open. Other types of circuits can be proposed for this same function and FIG. 14 shows another embodiment which includes some of the same components as that embodiment of FIG. 6 and where that is the case, those components have been identified by the same reference numerals.

In this embodiment, however, rather than using a solid state switching device in the ECU 67, there is provided an engine temperature responsive switch 201 that is positioned in the engine in a location so as to be sensitive to the engine temperature or the temperature of the coolant in a cooling jacket 44. This switch is designed so as to open and close at a temperature that is lower than the temperature $T_s$ at which cleaning operation is initiated but still at a temperature above ambient temperature. The fused circuit 91 is connected to this switch 201 and energizes both the solenoid switch 92 to energize the constant voltage power source 79 and the relay switch 96 so as to supply power to the motor control 67 for operating the stepper motor 65 for a number of cycles after the engine has stopped. Once the cleaning operation has completed and the temperature of the engine falls further to the temperature at which the switch 201 is open, then power supply to the motor control 67 will be discontinued as well as power to the ECU 67.

Figure 15:
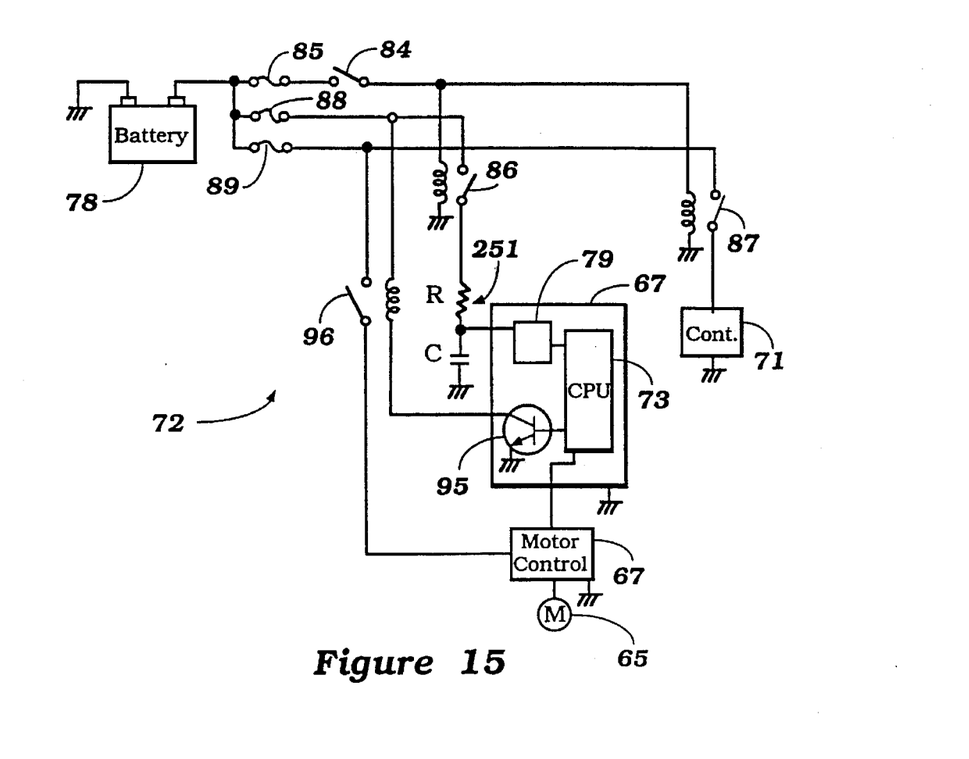
FIG. 15 is a schematic electrical diagram, in part similar to FIGS. 6 and 14 and shows yet another embodiment of the invention for controlling the exhaust control valve.

FIG. 15 shows another embodiment of the circuit for providing electrical power for the cleaning operation when the main switch 84 is opened. This circuit is basically the same as the circuit of FIG. 6, but the relay switch 86 provides electrical power directly to the stabilized power source 79 under all conditions through a circuit including an AR network for time operation. As a result, the relay switch 92 is not required.

With this system, when the switch 84 is opened, the capacitor of the RC circuit will have stored sufficient electrical engine so as to power the stabilized power source 79 for a time period adequate to permit the ECU 73 to maintain the transistor switch 95 in its on or inducting position so as to energize the relay switch 96 and provide electrical power to the motor control circuit 67 for a time period until the timer of the CPU runs out and/or the capacitor of the RC circuit has discharged.

Figure 16:
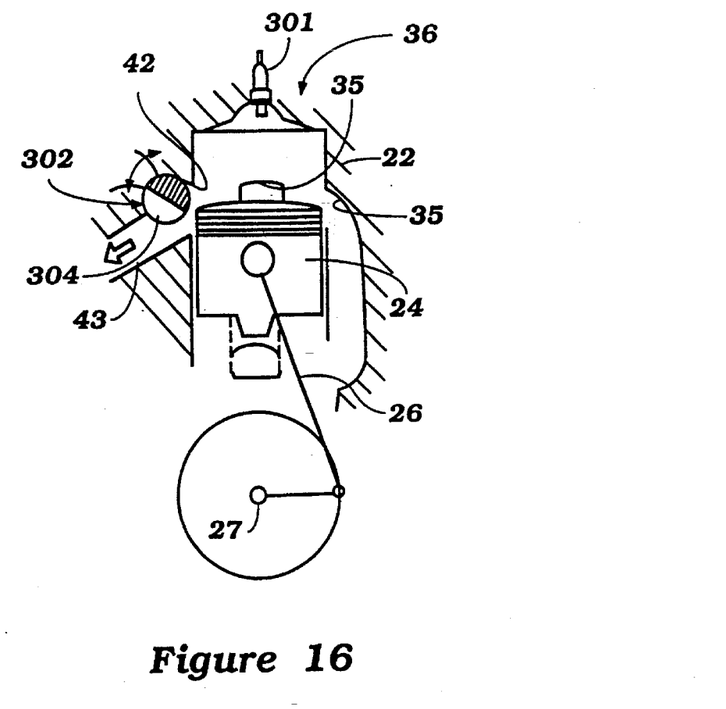
FIG. 16 is a cross sectional view, in part similar to FIG. 1 and shows yet another embodiment of the invention.
Figure 17:
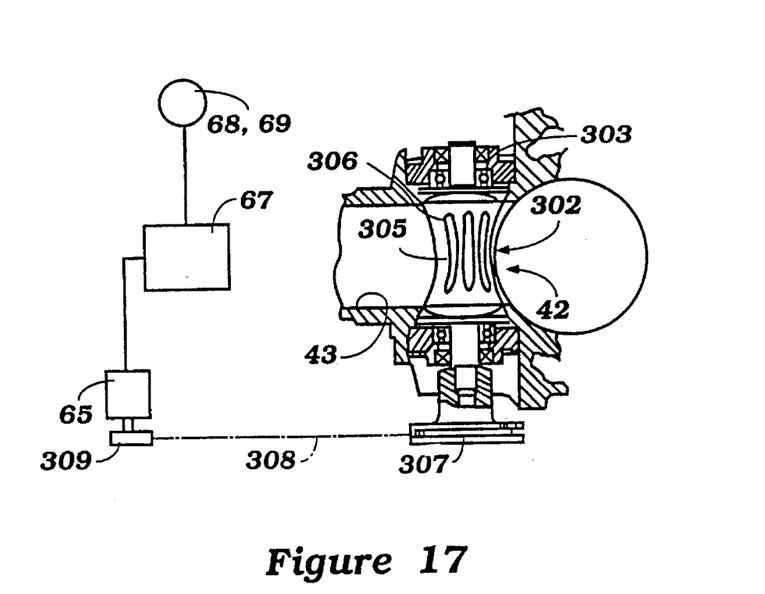
FIG. 17 is an enlarged cross sectional view taken through the exhaust port and shows the exhaust control valve. In this figure, the actuating components for the exhaust control valve are shown in part schematically.

In all of the embodiments thus far described, the invention has been illustrated as applied to a two cycle diesel engine. It is to be understood that the invention may be employed with spark ignited engines and FIGS. 16 and 17 show such an embodiment. In addition, the embodiments previously described have positioned the exhaust control valve 47 in an auxiliary or sub-exhaust port 48. It may be also understood that the invention can be applied where the exhaust control valve is positioned to selectively open and close an upper portion of the main exhaust port 42 and FIGS. 16 and 17 show such an embodiment. The basic construction of the engine is the same as the previously described embodiments and, for that reason, components which are the same or substantially the same have been identified by the same reference numerals. In this embodiment, only those components which differ from the previously described embodiment will be described.

In this embodiment since the engine is spark ignited, a spark plug 301 is mounted in the cylinder head 36 and is fired by a suitable ignition circuit.

Positioned within the upper portion of the main exhaust passage 43 contiguous to the exhaust port 42 is an exhaust control valve, indicated generally by the reference numeral 302. As with the previously described embodiments, the exhaust control valve 302 is rotatably journalled within a bore 303 that extends transversely across the exhaust passage, in this case the main exhaust passage 43. The exhaust control valve 302 has a cutout 304 so that when it is rotated to its fully opened position, there will be no obstruction to the exhaust passage 43 or exhaust port 42 and the effective compression ratio will be lowered. However, when the exhaust control valve is rotated in a clockwise direction to the position shown in FIG. 16, the outer surface of the exhaust control valve 302 will close off the upper portion of the exhaust passage 43 and mask the upper portion of the exhaust port 42 so as to raise the effective compression ratio.

Like the previously described embodiments, the unobstructed valving surface 305 of the exhaust control valve 302 is provided with slots 306 so as to assist in the cleaning operation.

In the previously described embodiments, the exhaust control valves have been directly coupled to the stepper motor 65 by a tongue and groove connection. In this embodiment, a pulley 307 is affixed to the shaft of the exhaust control valve 302 and is driven by a flexible transmitter 308 from a pulley 309 that is affixed to the output shaft of the stepper motor 65. This exhaust control valve may be operated in any desired sequence and also any sequence of cleaning operation, as aforedescribed, may be employed when the engine is shut off to effect the cleaning and avoid sticking on renewed operation.

It should be readily apparent from the foregoing description that the described embodiments of the invention provide a very effective exhaust control system for controlling the compression ratio of a two stroke internal combustion engine and, at the same time, ensuring that the exhaust control valve will not become stuck in position due to buildup of deposits when the engine is shut off and subsequently cools down. Of course, the foregoing description is that of a number of preferred embodiments of the invention and that various changes and modifications may be made without departing from the spirit and scope of the invention, as defined by the appended claims.

We claim:

1. An exhaust control valve for an internal combustion engine comprised of a member forming an exhaust passage, a cylindrical bore intersecting said exhaust passage and extending across both the width and height of said exhaust passage, a valve element having cylindrical end portions journalled in said bore on opposite sides of the width of said exhaust passage for rotation between first and second positions, said valve element having a valving portion formed between said end portions and movable to a non-obstructing position within a portion of said bore intersecting said exhaust passage when said valve element is in its first position for unrestricted flow through said exhaust passage and an obstructing position extending completely across said exhaust passage when in said second position, said valving portion having generally the shape of a cylindrical segment complementary to said bore portion, and a surface discontinuity formed in said cylindrical section to form a scraping edge for clearing of both sides of the height of said bore portion upon rotation of said valve element.

2. The exhaust control valve for an internal combustion engine as defined in claim 1, wherein the surface discontinuity is formed by a flat machined in the cylindrical surface.

3. The exhaust control valve for an internal combustion engine as defined in claim 2, wherein the flat has a width less than the cord of the portion of the bore which extends along the side of the exhaust passage.

4. An exhaust control valve for an internal combustion engine comprised of a member forming an exhaust passage, a cylindrical bore intersecting said exhaust passage, a valve element having cylindrical end portions journalled in said bore on opposite sides of said exhaust passage for rotation between first and second positions, said valve element having a valving portion formed between said end portions and movable to a non-obstructing position within a portion of said bore intersecting said exhaust passage when said valve element is in its first position for unrestricted flow through said exhaust passage and an obstructing position extending across said exhaust passage when in said second position, said valving portion having generally the shape of a cylindrical segment complementary to said bore portion, and a surface discontinuity formed in said cylindrical section to form a scraping edge for clearing of said bore portion upon rotation of said valve element comprised of a plurality of helically shaped grooves formed in said cylindrical segment surface thereof.

5. The exhaust control valve for an internal combustion engine as defined in claim 4, wherein the grooves are of a length less than the cord of the portion of the bore extending along the exhaust passage.

* * * * *